United States Patent
Zeng et al.

(10) Patent No.: US 11,644,707 B1
(45) Date of Patent: May 9, 2023

(54) VIEWING ANGLE EXPANSION FILM COMPRISING A PLURALITY OF FIRST AND SECOND PROJECTIONS ARRAYED ON A FLAT LAYER, METHOD FOR PREPARING THE SAME, AND DISPLAY DEVICE

(71) Applicants: Huizhou China Star Optoelectronics Display Co., Ltd., Huizhou (CN); TCL China Star Optoelectronics Technology Co., Ltd., Shenzhen (CN)

(72) Inventors: Guang Zeng, Huizhou (CN); Yuan Shao, Shenzhen (CN); Yue Wang, Huizhou (CN); Hongshan Yin, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/899,754

(22) Filed: Aug. 31, 2022

(30) Foreign Application Priority Data

Aug. 17, 2022 (CN) .......................... 202210987154.9

(51) Int. Cl.
*G02F 1/1335* (2006.01)
*G02F 1/13363* (2006.01)
*G02F 1/13* (2006.01)

(52) U.S. Cl.
CPC .... *G02F 1/133504* (2013.01); *G02F 1/13363* (2013.01); *G02F 1/1323* (2013.01)

(58) Field of Classification Search
CPC ............................... G02F 1/365; G02F 1/1323
See application file for complete search history.

(56) References Cited

U.S. PATENT DOCUMENTS

| | | | | |
|---|---|---|---|---|
| 2002/0021384 A1* | 2/2002 | Taniguchi | ............ | G02B 6/0036 349/65 |
| 2003/0030764 A1* | 2/2003 | Lee | ...................... | G02B 6/0065 349/65 |
| 2003/0086030 A1* | 5/2003 | Taniguchi | .............. | G02B 6/005 349/61 |

* cited by examiner

*Primary Examiner* — Paul C Lee (57) ABSTRACT

A viewing angle expansion film, a method for preparing the same, and a display device are provided. The viewing angle expansion film includes a first film layer having a flat layer, a plurality of first projections, and a plurality of second projections, and a second film layer disposed on the first film layer. The plurality of first projections and the plurality of second projections are arrayed on the flat layer. The second film layer is filled in gaps between the first projections and the second projections adjacent to the first projections, gaps between adjacent first projections, and gap between adjacent second projections. A refractive index of the second film layer is greater than a refractive index of the first film layer.

16 Claims, 5 Drawing Sheets

VIEWING ANGLE EXPANSION FILM COMPRISING A PLURALITY OF FIRST AND SECOND PROJECTIONS ARRAYED ON A FLAT LAYER, METHOD FOR PREPARING THE SAME, AND DISPLAY DEVICE

CROSS-REFERENCE TO RELATED APPLICATION

This application claims priority to Chinese Patent Application No. 202210987154.9, filed on Aug. 17, 2022, which is hereby incorporated by reference in its entirety.

TECHNICAL FIELD

The present disclosure relates to the field of display technology, and more particularly, to a viewing angle expansion film, a method for preparing the same, and a display device.

BACKGROUND

Liquid crystal displays (LCD) are based on a liquid crystal material. The liquid crystal material is disposed between two parallel plates, and an arrangement of molecules inside the liquid crystal material is changed by a voltage. As such, light-shielding and light-transmitting are achieved to display a color image which is different in depth and is misaligned. Moreover, as long as a filter layer for filtering three primary colors is disposed between the two parallel plates, color images are displayed.

Currently, liquid crystal displays with vertical alignment liquid crystal (VA) type have advantages such as high contrast, brilliant color, and fast response, and are widely used in consumer electronic products such as television. However, visual angle (viewing angle) of the VA-type liquid crystal display is less than visual angle of the in-plane switching (IPS) type liquid crystal display.

Although the viewing angle of the VA-type liquid crystal display has been improved by such as providing and arranging a plurality of pixels, the improvement is limited with only left and right viewing angles of the liquid crystal display being expanded. Thus, it is impossible to satisfy some special application scenarios, such as using in a shopping mall where requires not only large left and right viewing angles, but also large up and down viewing angles to clearly see scenarios in each direction from the liquid crystal display.

SUMMARY

A viewing angle expansion film, a method for preparing the viewing angle expansion film , and a display device are provided to solve the problems that only the left and right viewing angles of a liquid crystal display can be expanded and cannot meet the needs of expanding the left and right viewing angles and the up and down viewing angles.

In order to solve the above problem, the present disclosure provides a viewing angle expansion film comprising a first film layer having a flat layer, a plurality of first projections, and a plurality of second projections, wherein the plurality of first projections and the plurality of second projections are disposed on the flat layer, the plurality of first projections are spaced apart from each other in a first direction and a second direction perpendicular to the first direction, the plurality of first projections are arrayed on the flat layer, and long sides of the plurality of first projections extend parallel to the first direction; wherein the plurality of second projections are spaced apart from each other in the first direction and the second direction, the plurality of second projections are arrayed on the flat layer and spaced apart from the first projections, and long sides of the plurality of second projections extend parallel to the second direction; and a second film layer disposed on the first film layer, wherein the second film layer is filled in gaps between the first projections and the second projections adjacent to the first projections, gaps between adjacent first projections, and gap between adjacent second projections, wherein a refractive index of the second film layer is greater than a refractive index of the first film layer.

In an embodiment, the first projections and the second projections are alternately arranged in the first direction and/or the second direction.

In an embodiment, the first film layer and/or the second film layer further include a plurality of scattering particles, and a content of the scattering particles ranges from 1% to 30%.

In an embodiment, the refractive index of the first film layer ranges from 1.3 to 1.6, and the refractive index of the second film layer ranges from 1.5 to 1.9.

In an embodiment, each of the plurality of first projections includes a first slope and a second slope, the first slope intersects with the flat layer at a first intersection line, the second slope intersects with the flat layer at a second intersection line, and the first intersection line and the second intersection line are parallel to the first direction; wherein each of the plurality of second projections includes a third slope and a fourth slope, the third slope intersects with the flat layer at a third intersection line, the fourth slope intersects with the flat layer at a fourth intersection line, and the third intersection line and the fourth intersection line are parallel to the second direction.

In an embodiment, each of the plurality of first projections has a same shape and size with each of the plurality of second projection, and the first projection has isosceles trapezoidal prism shapes; wherein a length of a longer edge of the first projection ranges from 2 μm to 60 μm, a length of a shorter edge of the first projection ranges from 5 μm to 20 μm, a height of the first projection ranges from 4 μm to 20 μm, and an angle including between the first slope of the first projection and the flat layer is greater than 0° and less than 80°.

In an embodiment, in a cross-section parallel to the second direction, a sum of a distance between adjacent second projections and the length of the longer edge of the first projection ranges from 20 μm to 100 μm; in a cross-section parallel to the first direction, a sum of a distance between two adjacent first projections and the length of the longer edge of the first projection ranges from 20 μm to 80 μm, and a sum of the distance between adjacent second projections and the length of the shorter edge of the first projection ranges from 20 μm to 80 μm.

In order to solve the above problem, the present disclosure also provides a method for preparing a viewing angle expansion film, comprising: providing a substrate; providing a first film layer on the substrate; wherein the first film layer includes a flat layer, a plurality of first projections and a plurality of second projections, and the plurality of first projections and the plurality of second projections are disposed on the flat layer; wherein the plurality of first projections are spaced apart from each other in a first direction and a second direction perpendicular to the first direction, and are arrayed on the flat layer, and long sides of the plurality of first projections extend parallel to the first direction;

wherein the plurality of second projections are spaced apart from each other in the first direction and the second direction, and are arrayed on the flat layer, the plurality of second projections are spaced apart from the plurality of first projections, and long sides of the plurality of second projections extend parallel to the second direction; and providing a second film layer on the first film layer, wherein the second film layer is filled in gaps between the first projections and the second projections adjacent to the first projections, gaps between adjacent first projections, and gaps between adjacent second projections, and a refractive index of the second film layer is greater than a refractive index of the first film layer.

In an embodiment, providing the first film layer on the substrate includes: providing a flat layer on a light-exiting surface of the substrate; and coating a first resin on a surface of the flat layer on a side away from the substrate, and then forming a plurality of first projections and a plurality of second projections after exposure development patterning.

In order to solve the above problem, the present disclosure also provides a display device including the viewing angle expansion film described above.

According to the present disclosure, the viewing angle expansion film includes a first film layer having a low refractive index and a second film layer having a high refractive index. Since the long sides of the plurality of first projections extend parallel to the first direction, the lights irradiate thereon are diffused toward the second direction. Since the long sides of the plurality of second projections extend parallel to the second direction, the lights irradiate thereon are diffused toward the first direction. As such, the lights are diffused by the viewing angle expansion film toward the first direction and the second direction at the same time. When the viewing angle expansion film is applied to the display device, the viewing angle of the display device in the first direction and the second direction can be expanded at the same time.

BRIEF DESCRIPTION OF THE DRAWINGS

In order that the technical solution in the embodiments of the present disclosure may be explained more clearly, references will now be made briefly to the accompanying drawings required for the description of the embodiments. It will be apparent that the accompanying drawings in the following description are merely some of the embodiments of the present disclosure, and other drawings may be made to those skilled in the art without any inventive effort.

Reference Numerals:

100. display device;
1. backlight module; 2. first polarizer;
3. array substrate; 4. liquid crystal layer;
5. color film substrate; 6. second polarizer;
7. viewing angle expansion film;
71. first film layer; 72. second film layer;
73. substrate;
711. flat layer; 712. first projection;
713. second projection;
7121. first slope; 7122. second slope;
7131. third slope; 7132. fourth slope.

DETAILED DESCRIPTION OF THE EMBODIMENTS

Preferred embodiments of the present disclosure will now be described in detail with reference to the accompanying drawings, in order to provide those skilled in the art with a complete description of the technical solutions of the present disclosure. In order to demonstrate, by way of example, that the present disclosure may be practiced, so that the technical solutions disclosed herein may be made clearer and may be readily understood by those skilled in the art. The disclosure may, however, be embodied in many different forms of embodiments, the scope of protection of the disclosure is not limited to the embodiments mentioned herein, and the following description of the embodiments is not intended to limit the scope of the disclosure.

Reference to directional terms of the present disclosure, such as "upper", "lower", "front", "rear", "left", "right", "inner", "outer", "side", and the like, is intended to be merely directional in the drawings, and is used herein to explain and illustrate the present disclosure and not to limit the scope of the present disclosure.

In the drawings, components having the same structure are denoted by the same reference numerals, and components having similar structures or functions are denoted by similar reference numerals. Furthermore, for ease of understanding and description, the dimensions and thicknesses of each of the components shown in the drawings are arbitrarily shown, and the disclosure does not define the dimensions and thicknesses of each of the components.

Embodiment 1

Figure 1:
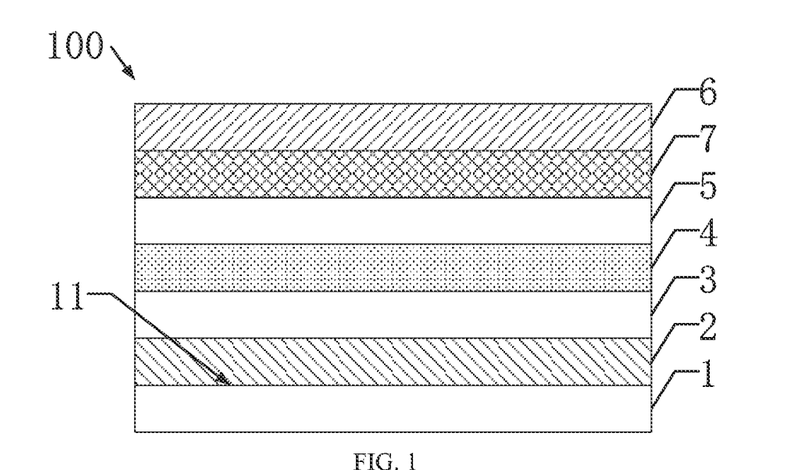
FIG. 1 is a schematic structural diagram of a display device according to Embodiment 1 of the present disclosure.

As shown in FIG. 1, a display device 100 is provided. The display device 100 includes a backlight module 1, a first polarizer 2, an array substrate 3, a liquid crystal layer 4, a color film substrate 5, a second polarizer 6, and a viewing angle expansion film 7.

The backlight module 1 has a light-exiting side 11. The backlight module 1 includes a light source (not shown), an optical film (not shown), a reflective sheet (not shown), and the like. The light source may be a direct light source or a side light source.

The first polarizer 2 is disposed on the light-exiting side 11 of the backlight module 1. The first polarizer 2 includes polyvinyl alcohol (PVA), and tri-cellulose acetate (TAC) disposed on both sides of the PVA. A layer made of the PVA plays a role of polarization. However, since the PVA is easily hydrolyzed, a (TAC) film having a high light transmittance, good water resistance and a certain mechanical strength is compounded on both sides of the layer made of the PVA to protect the physical characteristics of the polarizer.

The array substrate 3 is disposed on a side of the first polarizer 2 away from the backlight module 1. The array substrate 3 includes a film layer structure such as a thin film transistor (not shown) and a first alignment film (not shown).

The color film substrate 5 is disposed opposite to the array substrate 3 and is located on a side of the array substrate 3 away from the backlight module 1. The color film substrate 5 includes a film layer structure such as a second alignment film (not shown), a color filter (not shown), and a black matrix (not shown).

The liquid crystal layer 4 is disposed between the array substrate 3 and the color film substrate 5.

The second polarizer 6 is disposed on the side of the color film substrate 5 away from the backlight module 1. The second polarizer 6 includes polyvinyl alcohol (PVA), and tri-cellulose acetate (TAC) disposed on both sides of the PVA. A layer made of the PVA plays a role of polarization. However, since the PVA is easily hydrolyzed, a (TAC) film having a high light transmittance, good water resistance and a certain mechanical strength is compounded on both sides of the layer made of the PVA to protect the physical characteristics of the polarizer. A polarization direction of the second polarizer 6 is perpendicular to a polarization direction of the first polarizer 2.

In this embodiment, a viewing angle expansion film 7 is disposed between the color film substrate 5 and the second polarizer 6. In other embodiments, the viewing angle expansion film 7 may also be disposed on a side of the second polarizer 6 away from the backlight module 1.

Figure 2:
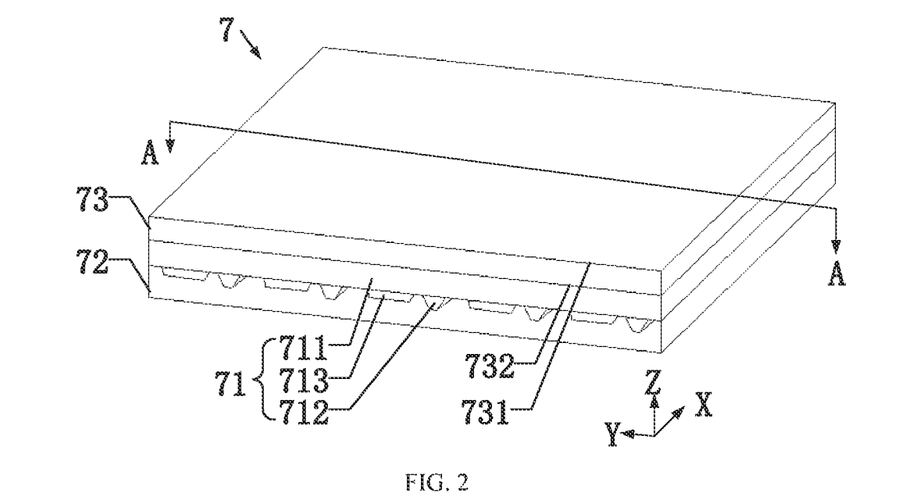
FIG. 2 is a schematic structural diagram of a viewing angle expansion film according to Embodiment 1 of the present disclosure.
Figure 3:
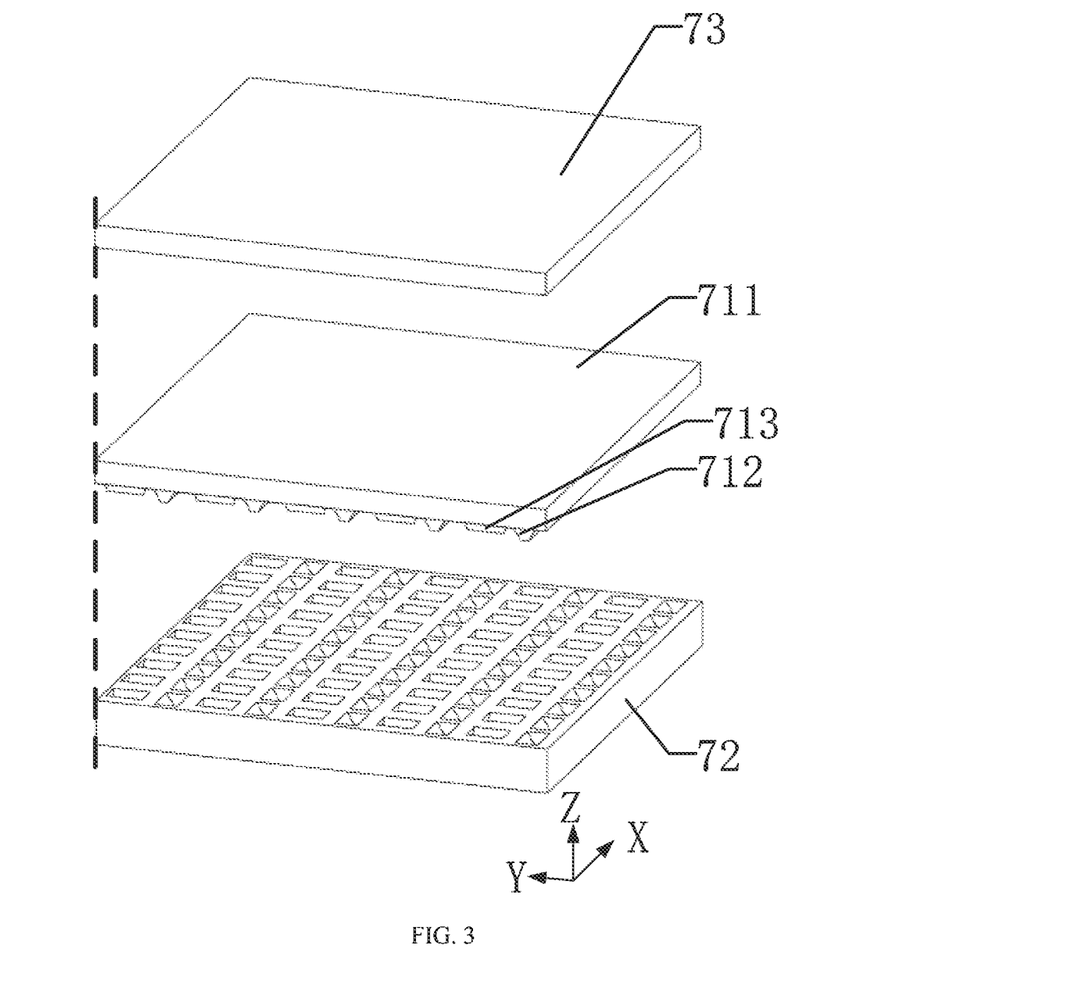
FIG. 3 is an schematic exploded diagram of the viewing angle expansion film of FIG. 2.
Figure 5:
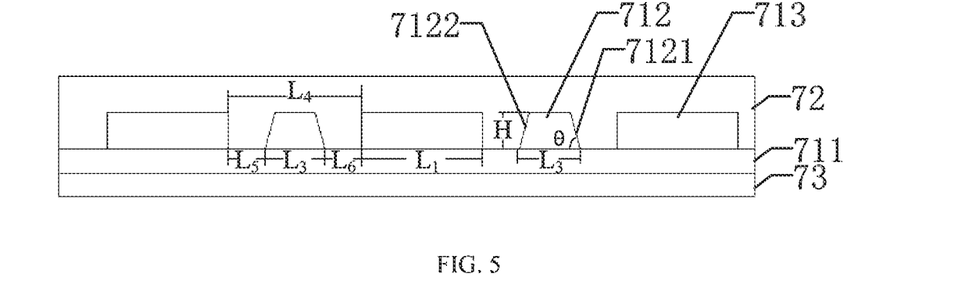
FIG. 5 is a cross-sectional view A-A of FIG. 2.

As shown in FIGS. 2, 3, and 5, the viewing angle expansion film 7 includes a first film layer 71, a second film layer 72, and a substrate 73.

The substrate 73 has a light-entering surface 731 and a light-exiting surface 732 which are oppositely disposed. It should be understood that the light-entering surface 731 of the substrate 73 refers to a surface of the substrate 73 close to a side of the backlight module 1. The material of the substrate 73 may be light-transmitting glass. As a result, the substrate 73 also has good light transmission performance when supporting the first film layer 71 and the second film layer 72 thereon.

The first film layer 71 is disposed on the light-exiting surface 732 of the substrate 73. The material of the first film layer 71 is a first resin. In this embodiment, the material of the first film layer 71 is a first light-transmitting resin. A refractive index of the first film layer 71 may range from 1.3 to 1.6. In this embodiment, the refractive index of the first film layer 71 is 1.4.

The first film layer 71 includes a flat layer 711 and a plurality of first projections 712, and a plurality of second projections 713, wherein the plurality of first projections 712 and the plurality of second projections 713 are disposed on the flat layer 711.

The flat layer 711 is disposed on the light-exiting surface 732 of the substrate 73. The flat layer 711 primarily provides a flat surface for the preparation of the first projections 712 and the second projections 713 thereon. A thickness of the flat layer 711 may range from 1 μm to 10 μm. In this embodiment, the flat layer 711 has a thickness of 5 μm.

In other embodiments, the first film layer 71 also includes a plurality of scattering particles, which improves diffusive effect of the viewing angle expansion film 7. The scattering particles are preferably circular scattering particles, the diameter of the scattering particle ranges from 0.05 μm to 2 μm, and the content of the scattering particles ranges from 1% to 30%. The material of the scattering particle may be selected from inorganic materials such as silica, titanium dioxide, barium sulfate, calcium carbonate, zirconium dioxide, and may be selected from organic particle materials such as polymethylmethacrylate (PMMA) particles, polycarbonate (PC) particles, and polystyrene (PS) particles.

Figure 4:
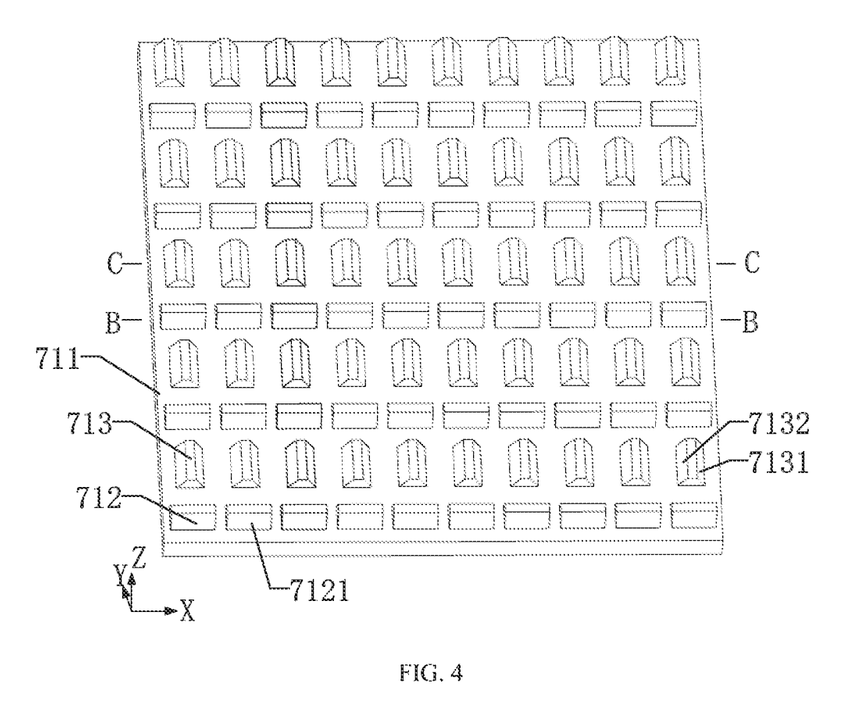
FIG. 4 is a schematic structural diagram of a first film layer of a viewing angle expansion film according to Embodiment 1 of the present disclosure.

As shown in FIG. 4, the first projections 712 are spaced apart from each other in a first direction X and a second direction Y perpendicular to the first direction X and are arrayed on the flat layer 711.

As shown in FIGS. 4 and 5, long sides of the first projections 712 extend parallel to the first direction X. Specifically, each of the first projections 712 includes a first slope 7121 and a second slope 7122. The first slope 7121 intersects with the flat layer 711 at a first intersection line, and the second slope 7122 intersects with the flat layer 711 at a second intersection line, wherein the first intersection line and the second intersection line are parallel to the first direction X.

As shown in FIG. 4, the second projections 713 are spaced apart from each other in the first direction X and the second direction Y and arranged in an array on the flat layer 711 and spaced apart from the first projections 712.

Figure 7:
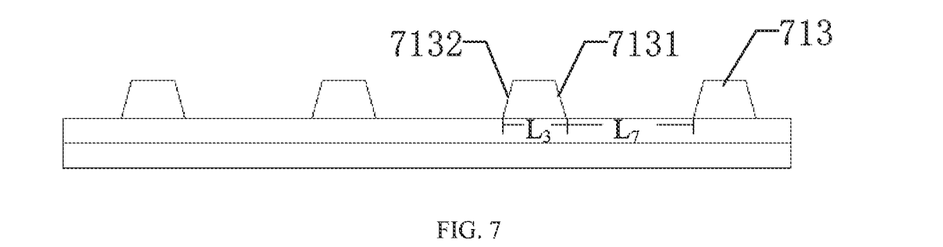
FIG. 7 is a cross-sectional view C-C of FIG. 4.

As shown in FIGS. 4 and 7, long sides of the second projections 713 extend parallel to the second direction Y. Each of the second projections 713 includes a third slope 7131 and a fourth slope 7132. The third slope 7131 intersects with the flat layer 711 at a third intersection line, and the fourth slope 7132 intersects with the flat layer 711 at a fourth intersection line, wherein the third intersection line and the fourth intersection line are parallel to the second direction Y.

As shown in FIGS. 2, 3, and 5, a second film layer 72 is disposed on the first film layer 71 and is filled in gaps between the first projections 712 and the second projections 713 adjacent to the first projections 712, the gap between the first projections 712 adjacent to each other, and the gap between the second projections 713 adjacent to each other. The material of the second film layer 72 is a second resin. In this embodiment, the material of the second film layer 72 is a second light-transmitting resin. The refractive index of the second film layer 72 is greater than the refractive index of the first film layer 71. The refractive index of the second film layer 72 may range from 1.5 to 1.9. In this embodiment, the refractive index of the second film layer 72 is 1.7.

In other embodiments, a plurality of scattering particles are also included in the second film layer 72. The diffusive effect of the viewing angle expansion film 7 is improved. The scattering particles are preferably circular scattering particles, the diameter of the scattering particle ranges from 0.05 μm to 2 μm, and the content of the scattering particles ranges from 1% to 30%. The material of the scattering particle may be selected from inorganic materials such as silica, titanium dioxide, barium sulfate, calcium carbonate, zirconium dioxide, and may be selected from organic particle materials such as polymethylmethacrylate (PMMA) particles, polycarbonate (PC) particles, and polystyrene (PS) particles.

The second slope 7122 of the first projection 712 diffuses the lights in the second direction Y. The light rays are diffused in the first direction X by The third slope 7131 and the fourth slope 7132 of the second projection 713 diffuses the lights in the first direction X. As such, the viewing angle expansion film 7 diffuses the lights in the first direction X and the second direction Y at the same time, thereby enlarging the viewing angle of the display device 100 in the first direction X and the second direction Y at the same time.

In the first direction X and/or the second direction Y, the first projections 712 and the second projections 713 are alternately arranged.

As shown in FIG. 4, in the second direction Y, the first projection 712 and the second projection 713 are alternately arranged. The first projections 712 and the second projections 713 are arranged periodically, so that the light-exiting uniformity of the display device 100 can be improved.

As shown in FIGS. 4, 5, 6, and 7, the first projection 712 and the second projection 713 have the same shape and size. In this embodiment, the shape of the first projection 712 is an isosceles trapezoid prism. In other words, the first projection 712 has an isosceles trapezoidal shape in a cross-section parallel to the second direction Y and the third direction Z.

Figure 6:
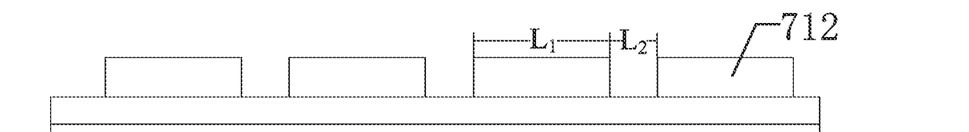
FIG. 6 is a cross-sectional view B-B of FIG. 4.

As shown in FIG. 6, a length L1 of a longer edge of the first projection 712 may range from 2 μm to 60 μm. In this embodiment, the length L1 of the longer edge of the first projection 712 is 40 μm.

As shown in FIG. 6, in a cross-section B-B parallel to the first direction X, a distance between the adjacent first projections 712 is distance L2, a sum of the distance L2 and the length L1 may range from 20 μm to 80 μm. In this embodiment, L2 is 10 μm and the sum of L1 and L2 is 50 μm.

As shown in FIG. 5, an angle θ is included between the first slope 7121 of the first projection 712 and the flat layer 711, and the angle θ is greater than 0° and less than 80°. In this embodiment, the angle θ included between the first slope 7121 of the first projection 712 and the flat layer 711 is 70°.

As shown in FIG. 5, in a cross-section A-A parallel to the second direction Y, a length L3 of a lower bottom edge of the first projection 712, i.e., a length of a shorter edge of the first projection 712, may range from 5 μm to 20 μm. In this embodiment, L3 is 10 μm. A height H of the first projection 712 may range from 4 μm to 20 μm. In this embodiment, H is 8 μm.

As shown in FIG. 5, in a cross-section A-A parallel to the second direction Y, a distance between the adjacent second projections 713 is distance L4, and a sum of the distance L4 and the length L1 of the second projections 713 may range from 20 μm to 100 μm. In this embodiment, L4=L3+L5+L6, wherein the distance L5 and the distance L6 represent a distance between the first projection 712 and the second projection 713 adjacent to the first projection 712. In this embodiment, L5=L6=12 μm, thus, L4=34 μm.

As shown in FIG. 7, in a cross-section C-C parallel to the first direction X, a distance between the adjacent second projections 713 is distance L7, and a sum of the distance L7 and the length L3 of the lower bottom edge of the first projection 712 may ranges from 20 μm to 80 μm. In this embodiment, L7 is 30 μm, and the sum of L7 and L3 is 40 μm.

By periodically arranging the first projections 712 and the second projections 713, the uniformity of the light-exiting of the display device 100 in the first direction X and the second direction Y can be improved.

Figure 8:
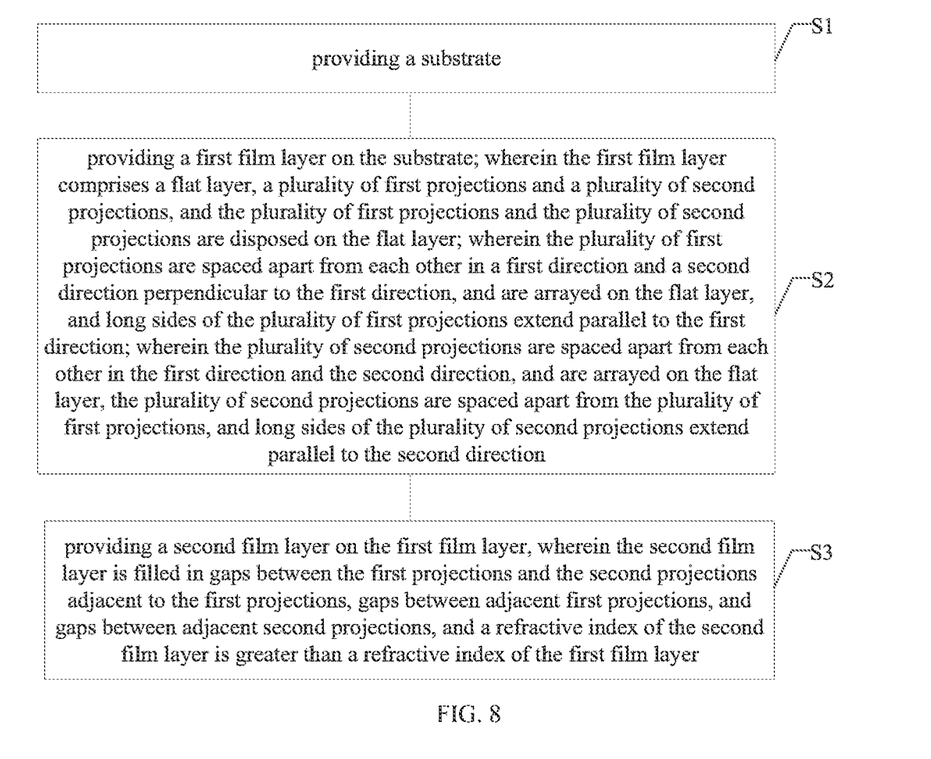
FIG. 8 is a schematic diagram showing preparation steps of a viewing angle expansion film according to Embodiment 1 of the present disclosure.

As shown in FIG. 8, a method for preparing the viewing angle expansion film 7 according to the present embodiment is provided. The method includes: S1, providing a substrate 73; S2, providing a first film layer 71 on the substrate 73; wherein the first film layer 71 includes a flat layer 711 and a plurality of first projections 712 and a plurality of second projections 713 disposed on the flat layer 711; the plurality of first projections 712 are spaced apart from each other in a first direction X and a second direction Y perpendicular to the first direction X and are arrayed on the flat layer 711, and long sides of the plurality of first projections 712 extend parallel to the first direction X; the plurality of second projections 713 are spaced apart from each other in the first direction X and the second direction Y and are arrayed on the flat layer 711, the plurality of second projections 713 are spaced apart from the first projections 712, and long sides of the plurality of second projections 713 extend parallel to the second direction Y; S3, providing a second film layer 72 is on the first film layer 71, wherein the second film layer 72 is filled in gaps between the first projections 712 and the second projections 713 adjacent to first projections 712, gaps between adjacent first projections 712, and gaps between adjacent second projections 713, and a refractive index of the second film layer 72 is greater than a refractive index of the first film layer 71.

Specifically, S2 includes: providing a flat layer 711 on a light-emitting surface of the substrate 73. Specifically, a first resin is coated on the light-emitting surface 732 of the substrate 73 by a slit coater, and is cured to form the flat layer 711.

Specifically, S2 further includes: coating a first resin on a surface of the flat layer 711 on a side away from the substrate 73 by a slit coater, and then forming a plurality of first projections 712 and a plurality of second projections 713 after exposure development patterning. The first film layer 71 includes the flat layer 711, the first projection 712 and the second projection 713.

Specifically, S3 includes: coating a first film layer 71 with a second resin by a slit coater, and then curing the second resin to form the second film layer 72, wherein the second resin is filled in gaps between the first projections 712 and the second projections 713 adjacent to first projections 712, gaps between the adjacent first projections 712 and gaps between the adjacent second projections 713. The viewing angle expansion film 7 includes the first film layer 71 and the second film layer 72.

Embodiment 2

Figure 9:
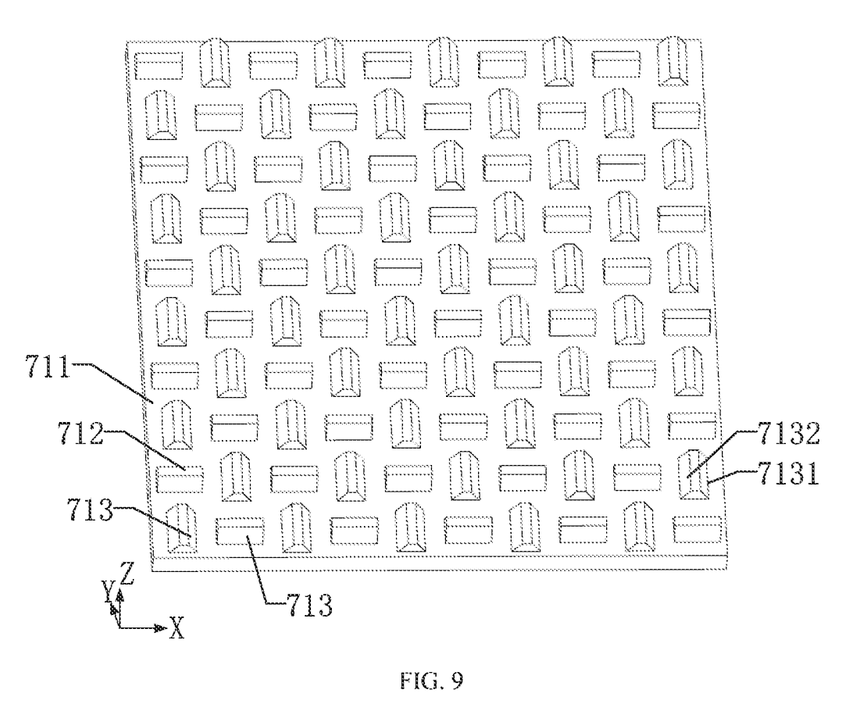
FIG. 9 is a schematic structural diagram of a first film layer of a viewing angle expansion film according to Embodiment 2 of the present disclosure.

As shown in FIG. 9, t most of the technical features are described in Embodiment 1, differing that in this embodiment, the first projections 712 and the second projections 713 are alternately arranged in the first direction X and the second direction Y. As a result, the uniformity of the light-exiting of the display device 100 in the first direction X and the second direction Y can be further improved.

A viewing angle expansion film, a method for preparing the same, and a display device are described in detail in present disclosure. The principles and embodiments of the present disclosure have been described with reference to specific examples. The description of the above examples is merely provided to help understand the present disclosure and the core idea thereof. At the same time, variations will occur to those skilled in the art in both the detailed description and the scope of disclosure in accordance with the teachings of the present disclosure. In view of the foregoing, the present disclosure should not be construed as limiting the disclosure.

What is claimed is:
1. A viewing angle expansion film, comprising :
a first film layer having a flat layer, a plurality of first projections, and a plurality of second projections, wherein the plurality of first projections and the plurality of second projections are disposed on the flat layer, the plurality of first projections are spaced apart from each other in a first direction and a second direction perpendicular to the first direction, the plurality of first projections are arrayed on the flat layer, and long sides of the plurality of first projections extend parallel to the first direction; wherein the plurality of second projections are spaced apart from each other in the first direction and the second direction, the plurality of second projections are arrayed on the flat layer and spaced apart from the first projections, and long sides of the plurality of second projections extend parallel to the second direction; and a second film layer disposed on the first film layer, wherein the second film layer is filled in gaps between the first projections and the second projections adjacent to the first projections, gaps between adjacent first projections, and gap between adjacent second projections, wherein a refractive index of the second film layer is greater than a refractive index of the first film layer.

2. The viewing angle expansion film of claim 1, wherein the first projections and the second projections are alternately arranged in the first direction and/or the second direction.

3. The viewing angle expansion film of claim 1, wherein the first film layer and/or the second film layer further comprise a plurality of scattering particles, and a content of the scattering particles ranges from 1% to 30%.

4. The viewing angle expansion film of claim 1, wherein the refractive index of the first film layer ranges from 1.3 to 1.6, and the refractive index of the second film layer ranges from 1.5 to 1.9.

5. The viewing angle expansion film of claim 1, wherein each of the plurality of first projections comprises a first slope and a second slope, the first slope intersects with the flat layer at a first intersection line, the second slope intersects with the flat layer at a second intersection line, and the first intersection line and the second intersection line are parallel to the first direction;

wherein each of the plurality of second projections comprises a third slope and a fourth slope, the third slope intersects with the flat layer at a third intersection line, the fourth slope intersects with the flat layer at a fourth intersection line, and the third intersection line and the fourth intersection line are parallel to the second direction.

6. The viewing angle expansion film of claim 1, wherein each of the plurality of first projections has a same shape and size with each of the plurality of second projection, and the first projection has isosceles trapezoidal prism shapes;

wherein a length of a longer edge of the first projection ranges from 2 μm to 60 μm, a length of a shorter edge of the first projection ranges from 5 μm to 20 μm, a height of the first projection ranges from 4 μm to 20 μm, and an angle including between the first slope of the first projection and the flat layer is greater than 0° and less than 80°.

7. The viewing angle expansion film of claim 6, wherein in a cross-section parallel to the second direction, a sum of a distance between adjacent second projections and the length of the longer edge of the first projection ranges from 20 μm to 100 μm;

wherein in a cross-section parallel to the first direction, a sum of a distance between two adjacent first projections and the length of the longer edge of the first projection ranges from 20 μm to 80 μm, and a sum of the distance between adjacent second projections and the length of the shorter edge of the first projection ranges from 20 μm to 80 μm.

8. A method for preparing a viewing angle expansion film, comprising:

providing a substrate;

providing a first film layer on the substrate; wherein the first film layer comprises a flat layer, a plurality of first projections and a plurality of second projections, and the plurality of first projections and the plurality of second projections are disposed on the flat layer; wherein the plurality of first projections are spaced apart from each other in a first direction and a second direction perpendicular to the first direction, and are arrayed on the flat layer, and long sides of the plurality of first projections extend parallel to the first direction; wherein the plurality of second projections are spaced apart from each other in the first direction and the second direction, and are arrayed on the flat layer, the plurality of second projections are spaced apart from the plurality of first projections, and long sides of the plurality of second projections extend parallel to the second direction; and providing a second film layer on the first film layer, wherein the second film layer is filled in gaps between the first projections and the second projections adjacent to the first projections, gaps between adjacent first projections, and gaps between adjacent second projections, and a refractive index of the second film layer is greater than a refractive index of the first film layer.

9. The method of claim 8, wherein providing the first film layer on the substrate comprises:

providing the flat layer on a light-exiting surface of the substrate; and coating a first resin on a surface of the flat layer on a side away from the substrate, and then forming a plurality of first projections and a plurality of second projections after exposure development patterning.

10. A display device, comprising a viewing angle expansion film, wherein the viewing angle expansion film comprises:

a first film layer having a flat layer, a plurality of first projections, and a plurality of second projections, wherein the plurality of first projections and the plurality of second projections are disposed on the flat layer, the plurality of first projections are spaced apart from each other in a first direction and a second direction perpendicular to the first direction, the plurality of first projections are arrayed on the flat layer, and the plurality of first projections extend parallel to the first direction; wherein the plurality of second projections are spaced apart from each other in the first direction and the second direction, the plurality of second projections are arrayed on the flat layer and spaced apart from the first projections, and the plurality of second projections extend parallel to the second direction; and a second film layer disposed on the first film layer, wherein the second film layer is filled in gaps between the first projections and the second projections adjacent to the first projections, gaps between adjacent first projections, and gap between adjacent second projections, wherein a refractive index of the second film layer is greater than a refractive index of the first film layer.

11. The display device of claim 10, wherein the first projections and the second projections are alternately arranged in the first direction and/or the second direction.

12. The display device of claim 10, wherein the first film layer and/or the second film layer further comprise a plurality of scattering particles, and a content of the scattering particles ranges from 1% to 30%.

13. The display device of claim 10, wherein the refractive index of the first film layer ranges from 1.3 to 1.6, and the refractive index of the second film layer ranges from 1.5 to 1.9.

14. The display device of claim 10, wherein each of the plurality of first projections comprises a first slope and a second slope, the first slope intersects with the flat layer at a first intersection line, the second slope intersects with the flat layer at a second intersection line, and the first intersection line and the second intersection line are parallel to the first direction;

wherein each of the plurality of second projections comprises a third slope and a fourth slope, the third slope intersects with the flat layer at a third intersection line, the fourth slope intersects with the flat layer at a fourth intersection line, and the third intersection line and the fourth intersection line are parallel to the second direction.

15. The display device of claim 10, wherein each of the plurality of first projections has a same shape and size with each of the plurality of second projection, and the first projection has isosceles trapezoidal prism shapes;

wherein a length of a longer edge of the first projection ranges from 2 μm to −60 μm, a length of a shorter edge of the first projection ranges from 5 μm to 20 μm, and an angle including between the first slope of the first projection and the flat layer is greater than 0° and less than 80°.

16. The display device of claim 15, wherein in a cross-section parallel to the second direction, a sum of a distance between adjacent second projections and the length of the longer edge of the first projection ranges from 20 μm to 100 μm;

wherein in a cross-section parallel to the first direction, a sum of a distance between two adjacent first projections and the length of the longer edge of the first projection ranges from 20 μm to 80 μm, and a sum of the distance between adjacent second projections and the length of the shorter edge of the first projection ranges from 20 μm to 80 μm.

* * * * *